(12) United States Patent
Hagano et al.

(10) Patent No.: US 8,147,917 B2
(45) Date of Patent: Apr. 3, 2012

(54) MANUFACTURING METHOD FOR ELASTIC MEMBER

(75) Inventors: Hiroyuki Hagano, Kiyosu (JP); Shinichiro Inoue, Kiyosu (JP); Koichi Tangiku, Kiyosu (JP); Toshiyuki Kinoshita, Settsu (JP)

(73) Assignees: Toyoda Gosei Co., Ltd., Aichi-pref. (JP); Daikin Industries, Osaka (JP)

( * ) Notice: Subject to any disclaimer, the term of this patent is extended or adjusted under 35 U.S.C. 154(b) by 0 days.

(21) Appl. No.: 12/947,104

(22) Filed: Nov. 16, 2010

(65) Prior Publication Data

US 2011/0104379 A1    May 5, 2011

Related U.S. Application Data

(62) Division of application No. 11/589,288, filed on Oct. 30, 2006, now abandoned.

(30) Foreign Application Priority Data

Oct. 31, 2005  (JP) .................... 2005-317068
Dec. 29, 2005  (JP) .................... 2005-380604

(51) Int. Cl.
*B05D 3/02* (2006.01)
(52) U.S. Cl. ........................................ 427/393.5
(58) Field of Classification Search .............. None
See application file for complete search history.

(56) References Cited

U.S. PATENT DOCUMENTS

| | | | |
|---|---|---|---|
| 4,503,179 A | | 3/1985 | Yoshimura et al. |
| 4,756,981 A | * | 7/1988 | Breault et al. ............... 429/469 |
| 5,061,575 A | | 10/1991 | Mohri et al. |
| 6,706,819 B1 | * | 3/2004 | Araki et al. ................ 525/199 |
| 2004/0155413 A1 | | 8/2004 | Sato et al. |
| 2006/0122333 A1 | * | 6/2006 | Nishio ........................ 525/199 |

FOREIGN PATENT DOCUMENTS

| | | |
|---|---|---|
| JP | A-02-107870 | 4/1990 |
| JP | A-05-214318 | 8/1993 |
| JP | A-05-279655 | 10/1993 |
| JP | A-06-049438 | 2/1994 |
| JP | A-09-109703 | 4/1997 |
| JP | A-2003-096438 | 4/2003 |
| JP | A-2004-060819 | 2/2004 |
| WO | WO 00/56825 | 9/2000 |

* cited by examiner

*Primary Examiner* — Erma Cameron
(74) *Attorney, Agent, or Firm* — Posz Law Group, PLC (57) ABSTRACT

The present invention provides a sealing member for fuel which includes a fluororubber base and a sliding-treated layer coating the surface of the base. The sliding-treated layer includes a matrix made from a fluororubber, a sliding thin film formed in the surface portion of the matrix from a molten first particulate solid lubricant, and a second particulate solid lubricant dispersed in the matrix and the sliding thin film without being melted.

3 Claims, 11 Drawing Sheets

MANUFACTURING METHOD FOR ELASTIC MEMBER

CROSS-REFERENCE TO RELATED APPLICATIONS AND INCORPORATION BY REFERENCE

The present application is a divisional of U.S. patent application Ser. No. 11/589,288 filed on Oct. 30, 2006, now abandoned, which claims priority under 35 U.S.C. §119 to Japanese Patent Application Nos. 2005-317068 filed on Oct. 31, 2005 and 2005-380604 filed on Dec. 29, 2005. The contents of these prior applications are incorporated herein by reference in their entireties.

TECHNICAL FIELD

The present invention relates to sealing members for fuel, such as gaskets (particularly for fuel caps), O-rings, packings, diaphragms and valves, which are likely to contact fuel, and paint compositions for those members.

BACKGROUND OF THE INVENTION

Gaskets for fuel caps have recently come to be formed from fluororubbers having high gasoline permeation resistance to comply with the requirement for fuel permeation control (Japanese Patent Application Publication No. JP-A-2004-60819). The gasket for a fuel cap has a fluororubber base surface coated with a sliding-treated layer to improve the sliding property of fluororubber so that the gasket may be able to slide smoothly on the seal rest of a filler neck when the fuel cap is tightened about the filler neck.

The inventors of the present invention have previously proposed in JP-A-2004-60819, as a sliding-treated layer, a baked coating of a sliding treatment agent comprising an aqueous emulsion containing a solid lubricant (e.g. a fluororesin powder), an urethane resin as a matrix (base material) and a reactive group-coupled alkyl trialkoxysilane compound (ATAS) (a silane coupling agent) as an adhesion improver. The combination of a urethane resin and ATAS gives a sliding-treated layer having an improved adhesion to fluororubber. Its improved adhesion is presumably due to the strength of the urethane resin improved by its thermosetting reaction during the baking of the layer and the hydrogen bonding between the ATAS and the fluororubber composition.

Figure 8:
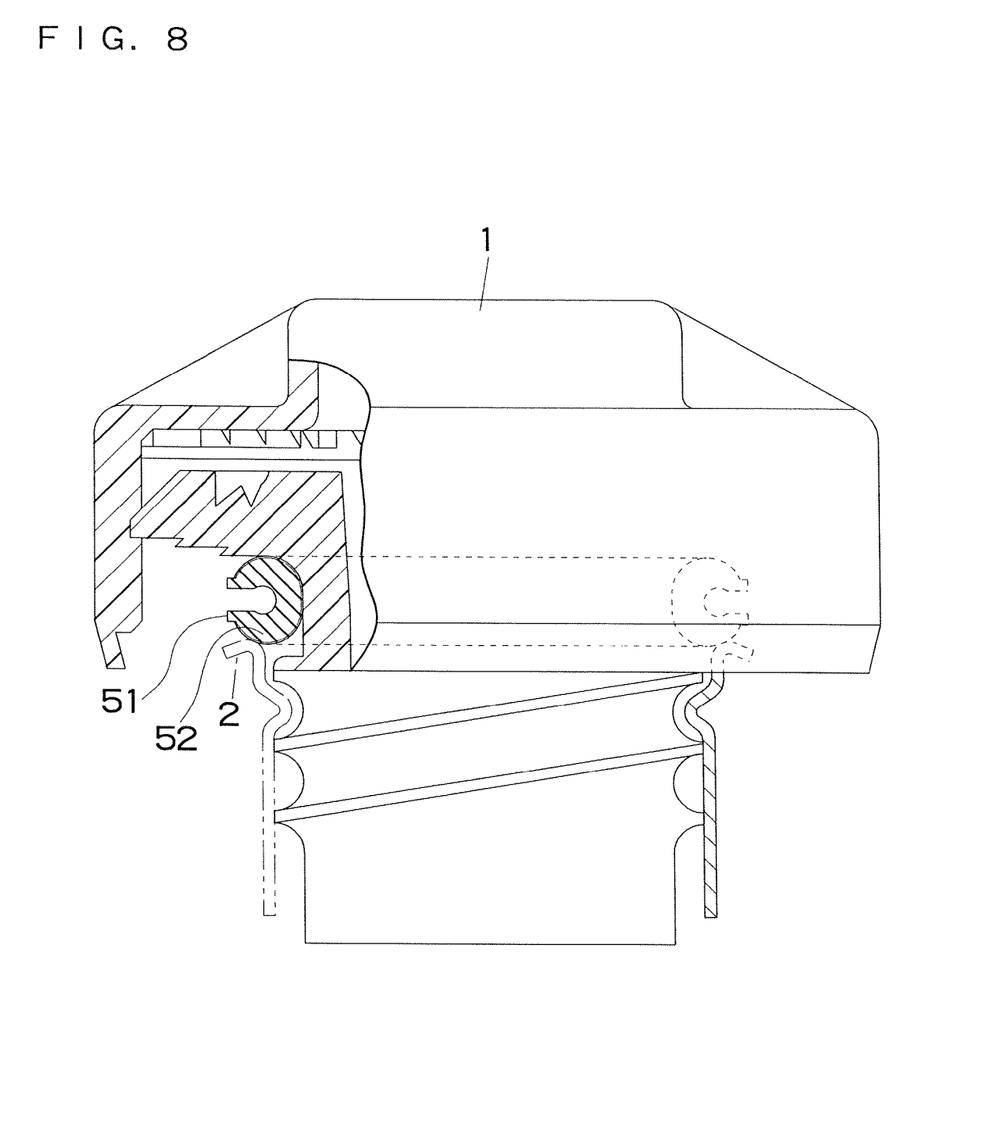
FIG. 8 is a cross-sectional view, partly in section, of a fuel cap including a gasket of the type known in the art.

Referring to FIG. 8, a gasket 51 employed for a fuel cap 1 in an automobile is in most of the cases a ring having a substantially C-shaped cross section and has a short lip 52 which is deformable only to a small extent, for example, 2 mm when pressed against a filler neck 2. The gasket 51 as described does not present any problem in particular even if its fluororubber base surface may be coated with a sliding-treated layer containing a urethane resin as the matrix.

Figure 9A:
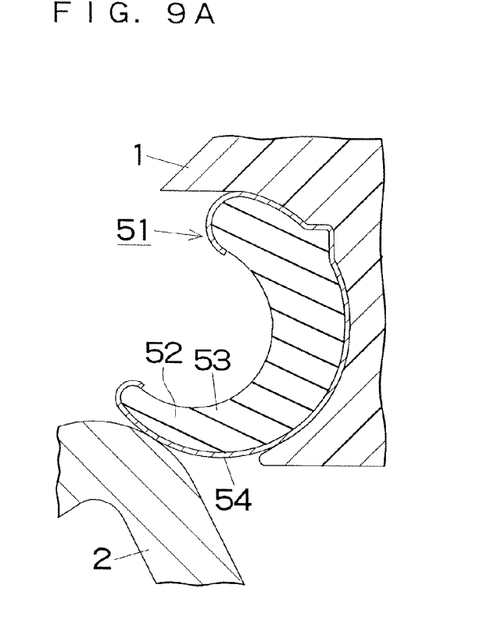
FIG. 9A is a cross-sectional view showing the gasket of FIG. 8 in its initial state.
Figure 9B:
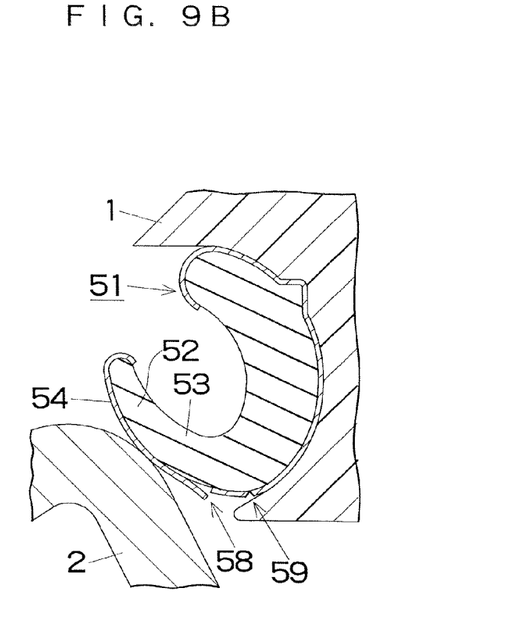
FIG. 9B is a view similar to FIG. 9A, but showing the gasket in its deformed state.
Figure 10:
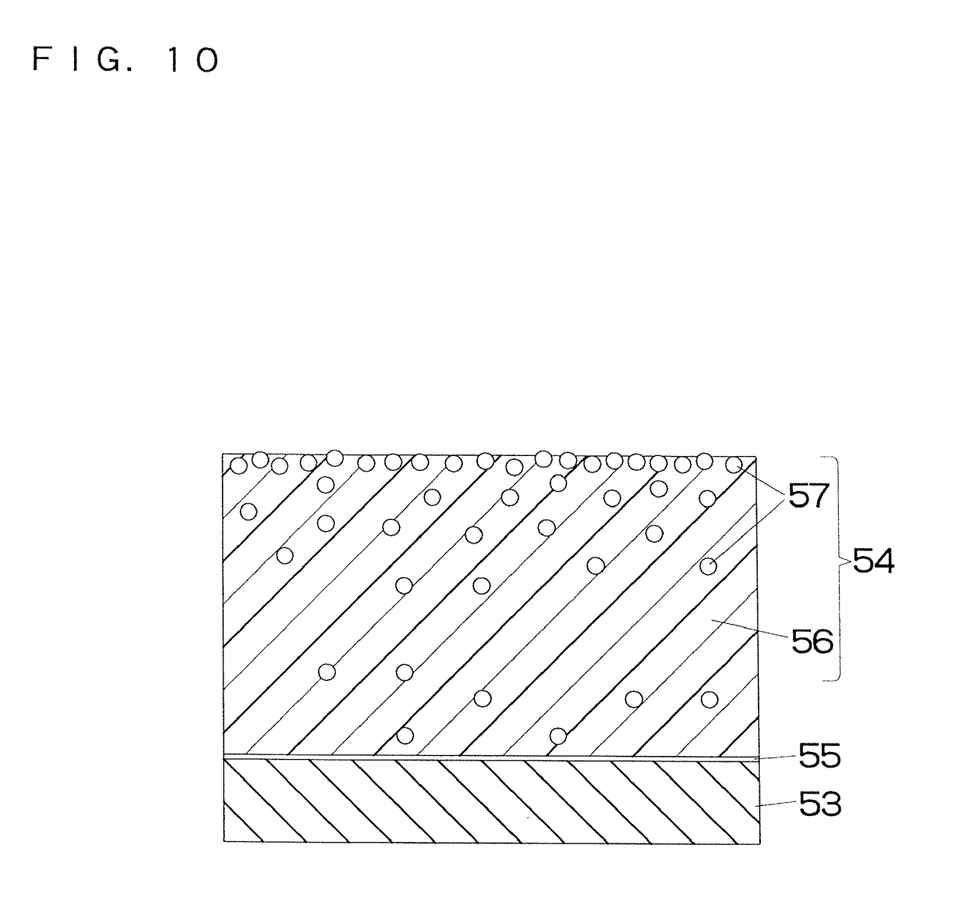
FIG. 10 is an enlarged cross-sectional view of a surface portion of the known gasket.

Referring to FIG. 9, however, there has recently been developed a gasket 51 having a substantially J-shaped cross section and having a long lip 52 which is deformable to about twice an extent, for example, 4.5 mm so that a fuel cap 1 may be put on or off by turning more easily and may be closed more tightly. The gasket 51 as shown in FIG. 9 is likely to present problems, such as interfacial separation and cracking, if its fluororubber base surface is coated with a sliding-treated layer containing a urethane resin as the matrix. FIG. 10 is an enlarged cross sectional view of a surface portion thereof.

FIG. 10 shows a fluororubber base 53 and a sliding-treated layer 54 composed of a silane coupling agent 55, a urethane resin as a matrix 56 and a fluororesin (polytetrafluoroethylene, or PTFE) powder as a solid lubricant 57. When the gasket 51 simply contacting the filler neck 2 as shown in FIG. 9A is pressed against it as shown in FIG. 9B by the fuel cap 1 forced into the filler neck 2, the interfacial separation 58 of the sliding-treated layer 54 from the base 53 or the cracking 59 of the sliding-treated layer 54 is likely to occur around the base portion of the lip 52 which has undergone a high degree of flexural deformation and thereby has a large amount of surface strain.

The interfacial separation of the sliding-treated layer 54 containing a urethane resin as the matrix 56 is apparently due to its insufficient adhesion to the fluororubber base 53 despite the presence of the silane coupling agent 55, and due to its low property of swelling with fuel. Its cracking is apparently due to its insufficient elongation (only about 45% as examined by the inventors of the present invention), and its low property of swelling with fuel.

Japanese Patent Application Publication No. JP-A-57-135871 describes an aqueous fluororubber paint containing a fluororesin (e.g. PTFE) in fluororubber and capable of forming a fluororubber coating having a surface in which the fluororesin is concentrated. International Patent Application Publication No. WO00/56825 describes a fluororubber paint composition containing a fluororesin [a combination of PTFE and a melting fluororesin (e.g. a tetrafluoroethylene-hexafluoropropylene copolymer, or FEP)] in fluororubber and used in a fuel system.

SUMMARY OF THE INVENTION

It is, therefore, an object of the present invention to provide a sealing member for fuel which has a high sliding property and is deformable without generation of interfacial separation of a sliding-treated layer from a base or cracking of the sliding-treated layer even when the deformation is large.

In order to solve the problems described above, the present invention employs the following means:

[1] A sealing member for fuel, which comprises: a base comprising a fluororubber and a sliding-treated layer coating the surface of the base, the sliding-treated layer comprising: a matrix comprising a fluororubber, a sliding thin film formed in the surface portion of the matrix from a molten first particulate solid lubricant, and a second particulate solid lubricant dispersed in the matrix and the sliding thin film without being melted.

[2] A paint composition for a sealing member for fuel which coats a fluororubber base surface of the sealing member, and thereafter, is baked to form a sliding-treated layer of the sealing member, the paint composition comprising: a matrix comprising a fluororubber, a first particulate solid lubricant comprising a fluororesin which can be melted, and a second particulate solid lubricant comprising a polytetrafluoroethylene having a molecular weight of 300,000 or less.

[3] A manufacturing method for a sealing member for fuel, which comprises the steps of: coating a fluororubber base surface of the sealing member for fuel with a paint composition which comprises a matrix comprising a fluororubber, a first particulate solid lubricant comprising a fluororesin that can be melted, a second particulate solid lubricant comprising a polytetrafluoroethylene having a molecular weight of 300,000 or less, and baking the paint composition after coated at a temperature which is higher than the melting point of the first particulate solid lubricant and lower than that of the second particulate solid lubricant, whereby forming a sliding-treated layer coated on the base surface.

Each of the elements in these means is illustrated in the following examples.

1. Sealing Member for Fuel:

Specific examples of sealing members for fuel include gaskets (particularly for fuel caps), O-rings, packings, diaphragms and valves.

2. Base:

The fluororubber (FKM) for the base is not limited in particular, and examples thereof include vinylidene fluoride-hexafluoropropylene copolymers (VDF-HFP), vinylidene fluoride-hexafluoropropylene-tetrafluoroethylene ternary copolymers (VDF-HFP-TFE), vinylidene fluoride-perfluoro-alkylvinylether-tetrafluoroethylene copolymers (VDF-PAVE-TFE modified) and tetrafluoroethylene-perfluorovinyl ether copolymers (fluorine-containing vinyl ether). VDF-PAVE-TFE modified type copolymers are, among others, preferred for their high cold resistance.

The vulcanized fluororubber is not limited in particular, and examples thereof include polyamine-, polyol- and peroxide-vulcanized ones. It is possible to add to fluororubbers other kinds of rubbers having good compatibility therewith to the extent that they do not adversely affect the properties of fluororubbers. It is also possible to add any of various kinds of known additives, such as reinforcing agents, inorganic fillers, softening agents, aging inhibitors, processing aids, vulcanization promoters, organic peroxides, crosslinking assistants, coloring agents, dispersing agents and flame retardants.

3. Sliding-treated Layer:

3-1. Fluororubber for the Matrix:

The fluororubber (FKM) for the matrix is not limited in particular, and examples thereof include vinylidene fluoride-hexafluoropropylene copolymers (VDF-HFP) and vinylidene fluoride-hexafluoropropylene-tetrafluoroethylene ternary copolymers (VDF-HFP-TFE). Ternary fluororubbers, such as vinylidene fluoride-hexafluoropropylene-tetrafluoroethylene ternary copolymers (VDF-HFP-TFE), are, among others, preferred for their high fuel oil resistance. The use of fluororubber for the matrix is due to its improved adhesion to the fluororubber base and its excellent property of swelling with fuel. Thus, even if the deformation of the sealing member is large in use, it does not cause any separation of the sliding-treated layer from the base or any cracking of the sliding-treated layer.

It is preferable to add a curing agent to the matrix material, since it promotes the surface migration of the first and second particulate solid lubricants as will be described later. The curing agent is not limited in particular, and examples thereof include amine, peroxide and polyol type vulcanizing agents. The amount of the curing agent is not limited in particular, but it is preferable to use 5 to 20 parts by mass of curing agent for 100 parts by mass of matrix. The addition of a larger amount of curing agent promotes the surface migration of the lubricants to a further extent, but the addition of too much gives a layer of lower elongation. It is also possible to add to the matrix material any other kind of rubber having good compatibility with fluororubber to the extent not adversely affecting the adhesion of the layer to the base, or it is further possible to add any of the known additives for rubber.

3-2. First Particulate Solid Lubricant:

The first particulate solid lubricant may be any one that can be melted when, for example, the matrix fluororubber is baked. Specific examples include fluororesins such as tetrafluoroethylene-hexafluoropropylene copolymers (FEP), polytetrafluoroethylenes (PTFE), tetrafluoroethyleneperfluoroalkylvinyl ether (PFVE) copolymers (PFA) and tetrafluoroethylene-ethylene copolymers (ETFE), as well as hard or ultrahard polyethylenes (PE) and polyamides (nylons). FEP is, among others, preferred for their low melting point and high sliding property.

The particle diameter of the first particulate solid lubricant is not limited in particular, but it is preferably from 0.1 to 1 μm. Its uniform dispersibility is lowered if its particle diameter is below 0.1 μm or above 1 μm. The amount of the first particulate solid lubricant is not limited in particular, but it is preferable to use 50 to 200 parts by mass of the first particulate solid lubricant for 100 parts by mass of matrix. If its amount is below 50 parts by mass, it is difficult to form any sliding thin film and if its amount exceeds 200 parts by mass, it is difficult to form any uniform coating.

3-3. Second Particulate Solid Lubricant:

The second particulate solid lubricant may be any one having a higher melting point than the first one, or of the non-melting type. Specific examples include fluororesins such as PTFE and PFA and inorganic materials such as molybdenum disulfide, boron nitride, graphite fluoride and tungsten disulfide [see Handbook of Chemistry, Practical Version, Third Revision (Mar. 15, 1980), Maruzen, page 965].

The particle diameter of the second particulate solid lubricant is not limited in particular, but it is preferably from 0.1 to 1 μm, and more preferably from 0.2 to 0.3 μm. Its dispersibility is lowered if its particle diameter is below 0.1 μm or above 1 μm. The amount of the second particulate solid lubricant is not limited in particular, but it is preferable to use 5 to 30 parts by mass of the second particulate solid lubricant for 100 parts by mass of matrix, based on dry mass excluding the dispersion which will be described below. Any amount thereof below 5 parts by mass is too small for dispersion in any surface sliding thin film and if its amount exceeds 30 parts by mass, it is difficult to form any uniform coating.

3-4. Combination of the First and Second Particulate Solid Lubricants:

Any combination may be useful if it is of a first particulate solid lubricant having a relatively low melting point and a second particulate solid lubricant having a relatively high melting point, and may, for example, be any combination of the materials listed before. A preferred combination is, however, of FEP as the first particulate solid lubricant and PTFE as the second.

In the present invention, PTFE is preferably a low-molecular weight PTFE, specifically having a molecular weight of 300,000 or less. The use of PTFE having a molecular weight of 300,000 or less produces the following advantages, since it uniformly disperse in the matrix and the sliding thin film:

(1) There will be obtained a paint which can form a reliable sliding-treated layer hardly having any unevenness, and giving a product having a low friction torque (its failure to be uniformly dispersed will, for example, allow FEP to appear locally and raise the friction torque of the product);

(2) There will be obtained a paint which is reliably applicable (a uniform paint is preferred, as the paint is sprayed onto the base surface).

The molecular weight of PTFE in the present invention is its number-average molecular weight (Mx) as estimated by molding a sample product from PTFE particles, measuring its standard specific gravity (SSG) and applying the value of its SSG to the known relational expression below:

$$SSG = -0.0579 \log Mx + 2.6113$$

The relational expression appears in, for example, Fluororesin Handbook, page 36 (Edited by Takaomi Satokawa and published by Nikkan Kogyo Shinbunsha on Nov. 30, 1990, First Edition, First Printing).

4. Base Surface Coated with the Sliding-Treated Layer:

The base may be coated with a sliding-treated layer on its surface portion adapted to slide on the surface of another member, its surface further including another surface portion, or its entire surface.

5. Material for the Sliding-Treated Layer (Paint Composition) and a Method of Applying it:

A paint composition as a material for the sliding-treated layer on the sealing member for fuel contains a matrix made from a fluororubber, a first particulate solid lubricant made from a fluororesin which can be melted and a second particulate solid lubricant made from a polytetrafluoroethylene having a molecular weight of 300,000 or less. The method for applying the material for the sliding-treated layer to the base is not limited in particular, but spray coating, dip coating and brush coating can be exemplified.

6. Baking of the Material for the Sliding-Treated Layer:

It is possible to employ any baking temperature that is higher than the melting point of the first particulate solid lubricant and lower than that of the second particulate solid lubricant, and it is preferable to employ a temperature which is higher than the melting point of the first particulate solid lubricant by 10° C. or more and lower than that of the second particulate solid lubricant by 10° C. or more. The baking temperature is higher than the melting point of the first particulate solid lubricant so that the first particulate solid lubricant may be melted to form a sliding-treated layer on the base surface upon cooling and solidifying, while the baking temperature is lower than the melting point of the second particulate solid lubricant so that the second particulate solid lubricant may be dispersed in its particulate form without being melted. When FEP having a melting point of 240 to 270° C. is employed as the first particulate solid lubricant, and PTFE having a melting point of 320 to 350° C. as the second particulate solid lubricant, it is preferable to select a baking temperature which is higher than the melting point of FEP by 10° C. or more and lower than that of PTFE by 10° C. or more.

The baking time is preferably from, for example, 5 to 60 minutes, though it may depend on the baking temperature.

7. Surface Migration of the First Particulate Solid Lubricant:

The first particulate solid lubricant is melted to form a sliding thin film in the surface portion of the matrix. It is formed as a natural result of a process for manufacturing the present invention, and it is conjectured that this occurs due to the following mechanism. When the material applied to the base surface to form a sliding-treated layer is baked at the temperature mentioned above, the fluororubber for the matrix has such a viscosity gradient across its thickness in the beginning that its viscosity is higher near the base side than near its surface side. Then, the first particulate solid lubricant migrates toward the surface side of the matrix where the viscosity is low and is so dispersed as to have a higher concentration in its surface portion than in its interior. As the baking of the material is continued after such migration, the first particulate solid lubricant in the surface portion of the matrix is melted to form a sliding thin film.

8. Thickness of the Sliding-treated Layer:

The thickness as baked of the sliding-treated layer is not limited in particular, but it is preferably from 3 to 40 μm and more preferably from 5 to 22 μm. If its thickness is smaller than 3 μm, the sliding-treated layer gets worn too quickly and if its thickness exceeds 40 μm, it is likely to crack easily.

9. Elongation of the Sliding-treated Layer:

The sliding-treated layer preferably has an elongation of 60% or more.

According to the sealing member for fuel and the paint composition therefor of the present invention, it is possible to obtain not only a high sliding property, but also the advantage that even the large deformation of the sealing member does not cause any interfacial separation of the sliding-treated layer from the base or any cracking of the sliding-treated layer.

DETAILED DESCRIPTION OF THE INVENTION

Figure 1A:
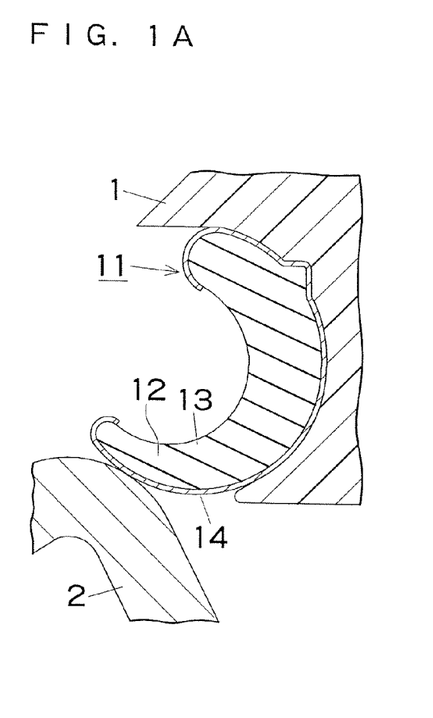
FIG. 1A is a cross-sectional view showing a gasket for a fuel cap according to an embodiment of the invention in its initial state.

FIG. 1A shows a gasket for a fuel cap as a sealing member for fuel embodying the present invention. It has a fluororubber base and a sliding-treated layer coating the base surface. The sliding-treated layer contains a matrix made from a fluororubber, a sliding thin film formed in the surface portion of the matrix from a molten first particulate solid lubricant, and a second particulate solid lubricant dispersed in the matrix and sliding thin film without being melted.

The gasket for a fuel cap is manufactured by coating the fluororubber base surface with a material for the sliding-treated layer containing a first particulate solid lubricant having a relatively low melting point and a second particulate solid lubricant having a relatively high melting point in fluororubber as the matrix material, and baking the material for the sliding-treated layer at a temperature which is higher than the melting point of the first particulate solid lubricant and lower than that of the second particulate solid lubricant, whereby the sliding-treated layer is formed on the base surface.

The first particulate solid lubricant is preferably FEP, while the second particulate solid lubricant is PTFE having a molecular weight of 300,000 or less, so that it may be possible to select a baking temperature which is higher than the melting point of FEP by 10° C. or more and lower than that of PTFE by 10° C. or more. The sliding-treated layer has an elongation of 60% or more.

EXAMPLES

An embodiment of the present invention for gaskets for automobile fuel caps will be described below. FIGS. 1 to 6 show an example in which the present invention is embodied in a highly deformable ring having a substantially J-shaped cross section. The gasket 11 has a long lip 12 which is deformable in use to as large an extent as, for example, 4.5 mm when pressed against a filler neck 2.

Figure 3A:
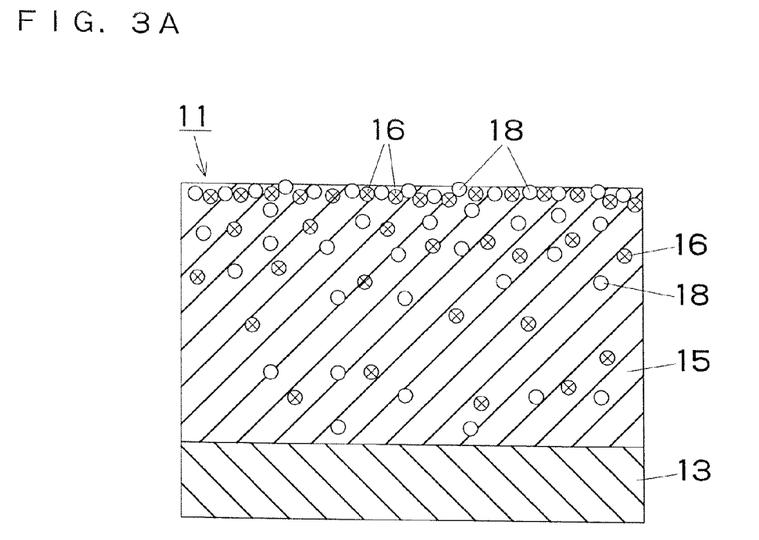
FIG. 3A is an enlarged cross-sectional view of a surface portion of the gasket in the beginning of baking of its material.
Figure 3B:
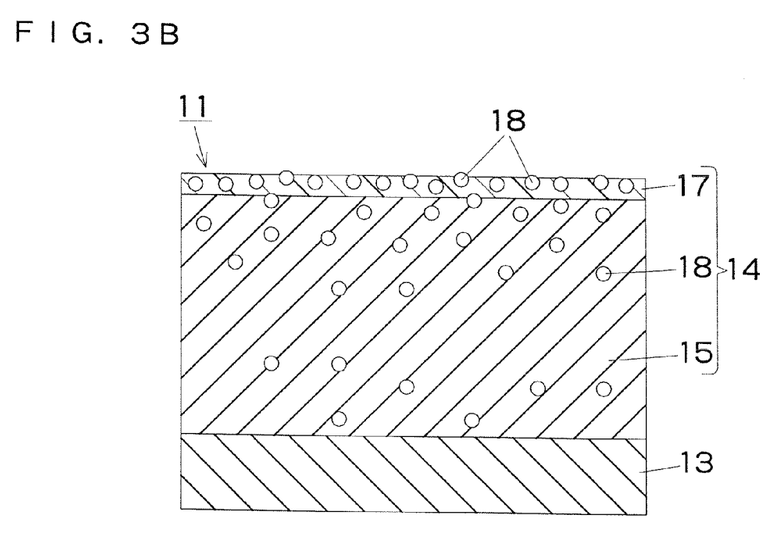
FIG. 3B is a view similar to FIG. 3A, but showing the surface portion of the gasket after the baking of its material.

The gasket 11 comprises a fluororubber base 13 and a sliding-treated layer 14 having a thickness of about 12 μm and covering the surface of the base 13 from its portion contacting a fuel cap 1 to its portion terminating in the outer edge of the lip 12. As shown in FIG. 3B, the sliding-treated layer 14 contains a matrix made from a fluororubber 15, a sliding thin film 17 formed in the surface portion of the matrix 15 from a molten first particulate solid lubricant 16 and a second particulate solid lubricant 18 dispersed in the matrix 15 and the sliding thin film 17 without being melted. The first particulate solid lubricant 16 is FEP and the second particulate solid lubricant 18 is PTFE having a molecular weight of 300,000 or less. The second particulate solid lubricant 18 is dispersed more in the sliding thin film 17 than in the matrix 15. The sliding-treated layer 14 has an elongation of 60% or more.

Figure 2:
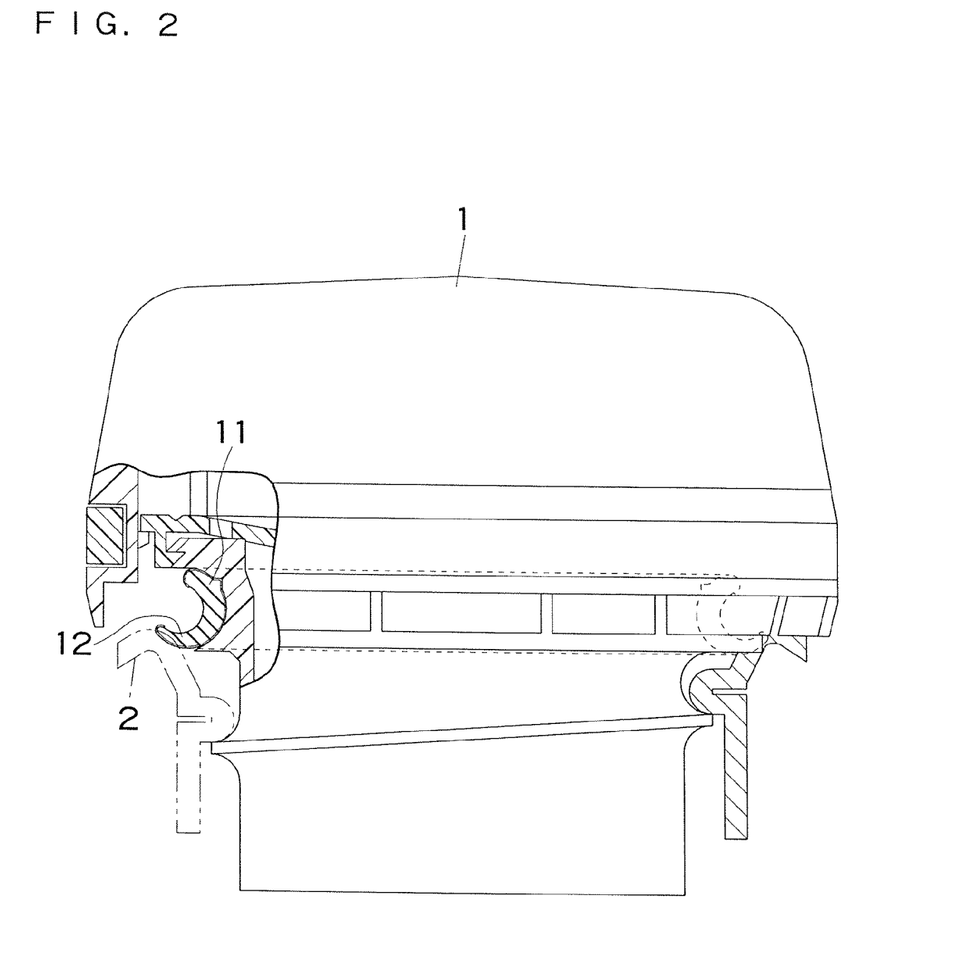
FIG. 2 is a cross-sectional view, partly in section, of the fuel cap including the gasket shown in FIG. 1A.

The gasket 11 was manufactured by carrying out the following steps:
1. Step of Molding the Base:
The base 13 for the gasket 11 as shown in FIGS. 1A to 2 was molded from a fluororubber composition containing the following and was vulcanized:

| | |
|---|---|
| VDF-PAVE-TFE modified type FKM | 100 parts by mass |
| MT black | 13 parts by mass |
| Calcium hydroxide, (Ca(OH)$_2$) | 3 parts by mass |
| Organic peroxide (hydroperoxide) | 3 parts by mass |
| Crosslinking assistant | 2 parts by mass |

2. Step of Coating with the Material for the Sliding-treated Layer:
The surface of the base 13 was spray coated with an emulsion of the following composition prepared as the material (paint composition) for the sliding-treated layer:

| | |
|---|---|
| VDF-HFP-TFE type FKM | 100 parts by mass |
| Amine curing agent | 7 parts by mass |
| Particulate FEP (melting point: 270° C.) | 120 parts by mass |
| Particulate PTFE having a molecular weight of 300,000 or less (melting point: 330° C.) | 11 parts by mass |

3. Step of Baking the Material for the Sliding-Treated Layer:
The gasket 11 as coated above was placed in a heating tank and the material for the sliding-treated layer was baked for 10 minutes at a temperature of 300° C. which was higher than the melting point of FEP and lower than that of PTFE, whereby the sliding-treated layer 14 was formed. During the beginning of its baking, the mechanism described before caused both of the first particulate solid lubricant 16 (FEP) and the second particulate solid lubricant 18 (PTFE having a molecular weight of 300,000 or less) to migrate toward the matrix surface side of lower viscosity, as shown in FIG. 3A. With the progress of its baking, as shown in FIG. 3B, the first particulate solid lubricant 16 was molten to form the sliding thin film 17 in the surface portion of the matrix 15 and the second particulate solid lubricant 18 was dispersed more in the sliding thin film 17 than in the matrix 15 and gave a roughened surface to the sliding thin film 17. The gasket 11 as baked was removed from the heating tank and allowed to naturally cool.

Figure 1B:
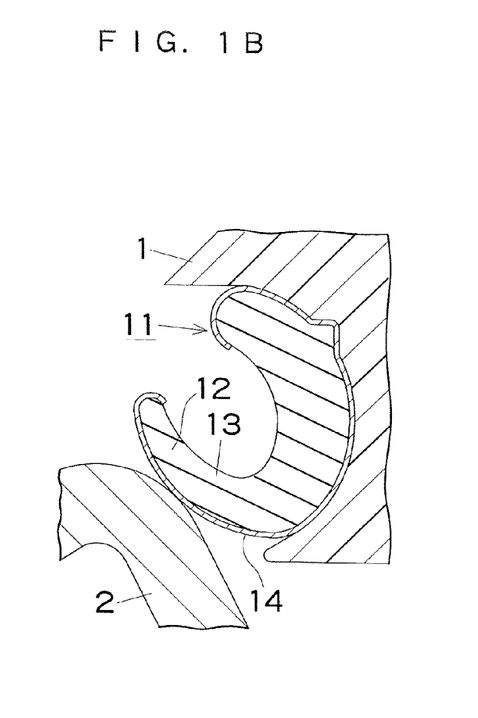
FIG. 1B is a view similar to FIG. 1A, but showing the gasket in its deformed state.

The gasket 11 as formed above was attached to the fuel cap 1, as shown in FIGS. 1A to 2. The gasket 11 simply contacting the filler neck 2 as shown in FIG. 1A was pressed against the filler neck 2, as shown in FIG. 1B, when the fuel cap 1 was forced thereinto. The sliding-treated layer 14 enabled the gasket 11 to slide smoothly on the filler neck 2. When the gasket 11 was pressed against the filler neck 2, its lip 12 was deformed or bent to a large extent, but there was no separation of the sliding-treated layer 14 from the base 13 or any cracking of the sliding-treated layer 14 even in the outer surface of the base of the lip 12 having a particularly large amount of surface strain.

No interfacial separation occurred, apparently because the sliding-treated layer 14 containing fluororubber as the matrix 15 had a sufficiently high degree of adhesion to the fluororubber base 13, and was excellently capable of swelling with fuel. No cracking occurred, apparently because the sliding-treated layer 14 containing fluororubber as the matrix had a sufficiently high degree of elongation and was excellently capable of swelling with fuel.

(Microscopic Observation)

Figure 4:
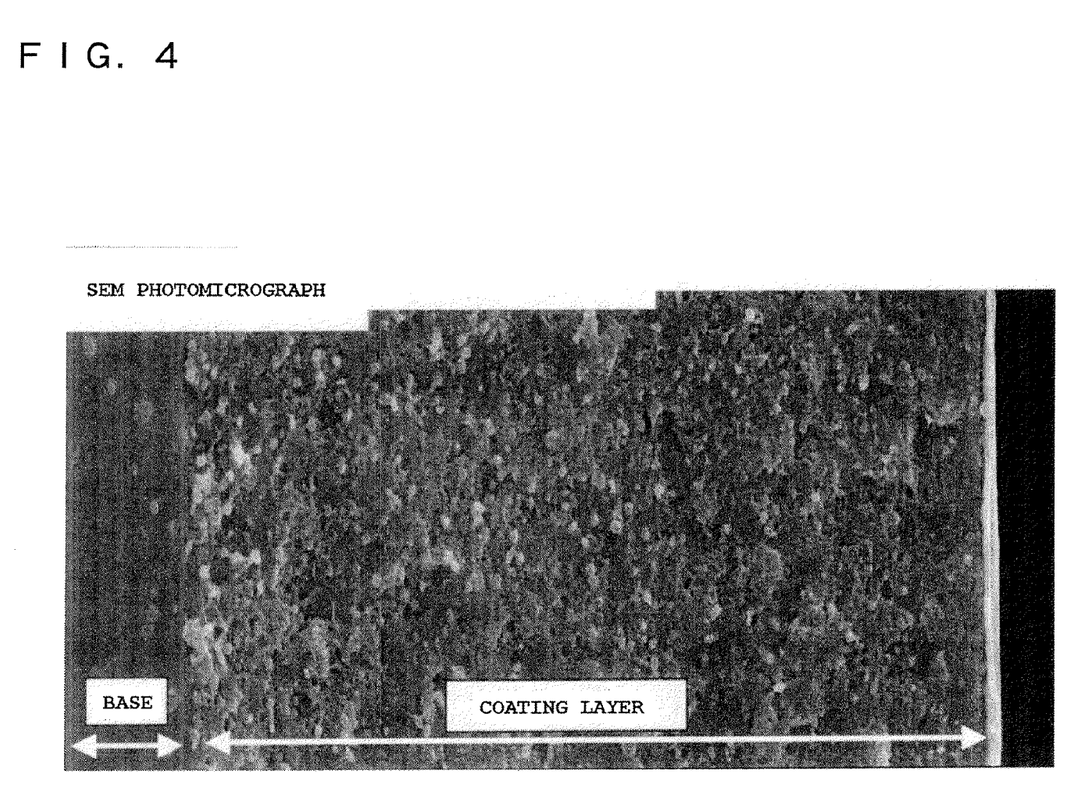
FIG. 4 is a photomicrograph of the surface portion of the gasket.

The observation of the surface portion of the gasket 11 thus obtained through a scanning electron microscope (SEM) of 10,000 magnifications confirmed the formation of a sliding thin film by molten FEP in the surface portion of the coating layer (sliding-treated layer), as shown in FIG. 4. While particles are found in the matrix of the sliding-treated layer, it is impossible to determine by SEM if those particles are of FEP or PTFE having a molecular weight of 300,000 or less. While FEP particles dispersed in the matrix are usually melted at the time of baking, there are also many FEP particles cured in particle form, and they cannot be distinguished in appearance from PTFE particles having a molecular weight of 300,000 or less and remaining in particle form without being melted.

(Measurement of Friction Torque)

Figure 5:
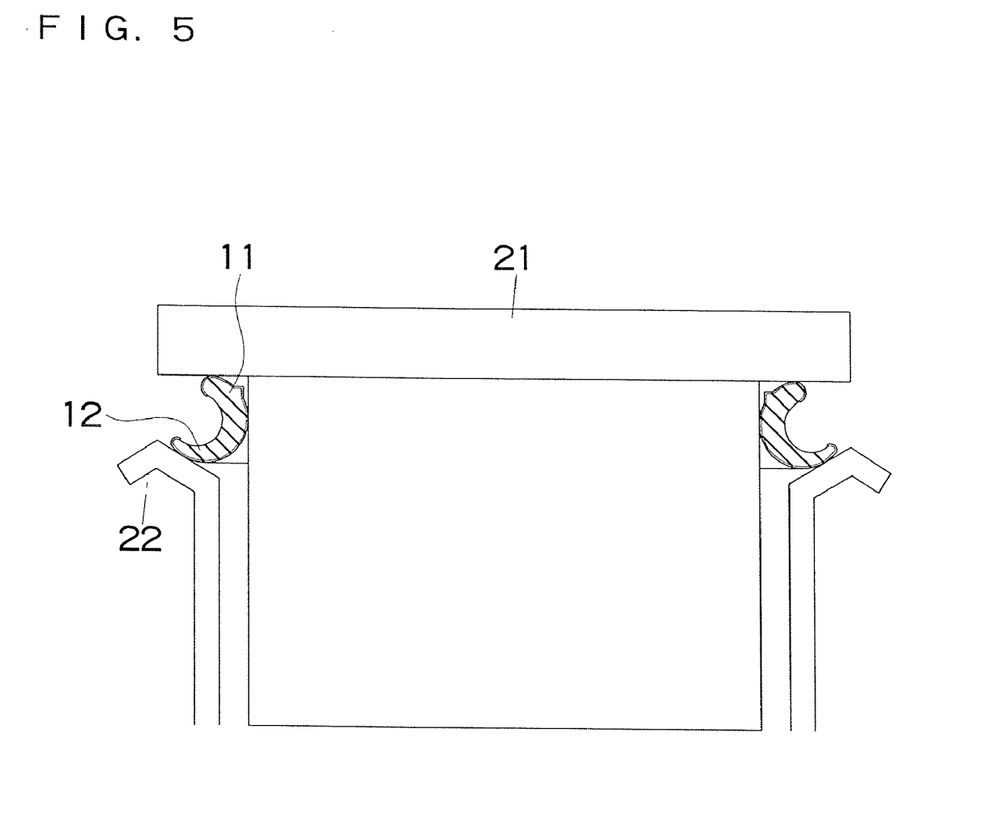
FIG. 5 is a diagram explaining a method employed for measuring the friction torque of the gasket.
Figure 6:
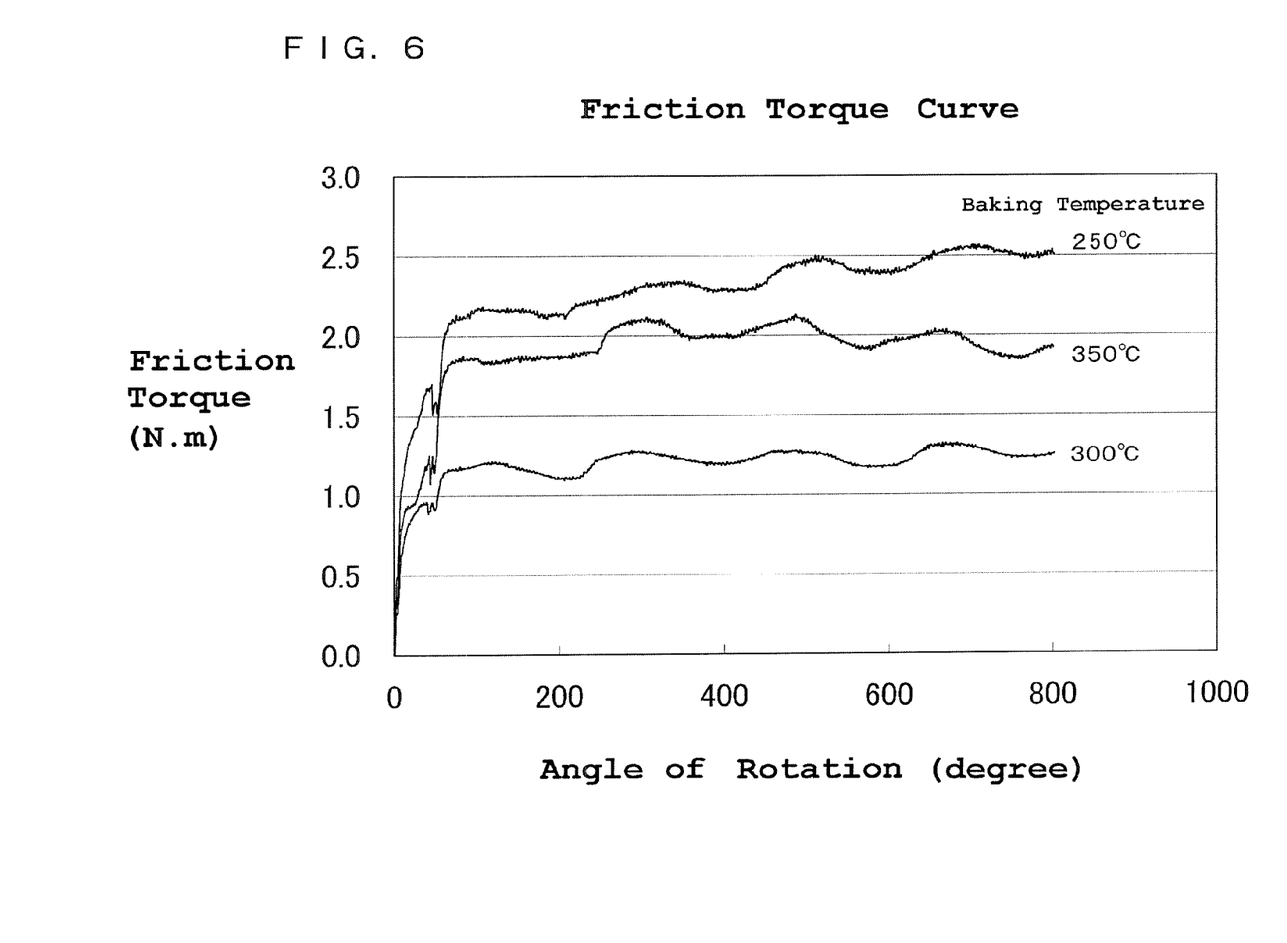
FIG. 6 is a graph showing the results of measurements of friction torque.

The gasket 11 was attached to a cap 21 imitating a fuel cap, but not having any male screw thread, as shown in FIG. 5, and the friction torque bearing on the gasket 11 was measured by rotating the gasket 11 with the cap 21 at a rotating speed of 30 degrees per minute, while pressing the gasket 11 with a force of 100 N against the neck 22 of a pipe imitating a filler neck, but not having any female screw thread. The measurement was made not only for the gasket baked at 300° C. as stated before, but also for gaskets baked at 250 and 350° C., respectively. The particulate FEP used for the gaskets had a melting point of 270° C. and the particulate PTFE having a molecular weight of 300,000 or less had a melting point of 330° C., as stated in the list of the materials for the composition before. The results of the measurements are shown in FIG. 6 and Table 1.

TABLE 1

| | Baking Temperature (° C.) | | |
|---|---|---|---|
| | 250 | 300 | 350 |
| Friction Torque (@100N) [N · m] | 2.26 | 1.19 | 1.89 |

Although the gaskets baked at 250° C. and 350° C. satisfied the currently prevailing standard for friction torque, the gasket baked at 300° C. showed a particularly excellent sliding property owing to its friction torque of 1.19 [Nm] at 100 N. It is considered, as described before, that particulate FEP was melted to form a sliding thin film, particulate PTFE was not melted, but formed a roughened surface on the surface portion, a contact area was only small, and PTFE had a low coefficient of dynamic friction, too.

(Additional Measurements)

Test pieces differing from the gaskets as tested above were prepared and tested for peeling strength, sliding property (coefficient of dynamic friction) and elongation.

(1) Peeling Strength:

Rubber sheets having a thickness of 2 mm were molded from the same fluororubber composition as that used in the examples described above, and were vulcanized. The particulate FEP used for the sheets had a melting point of 270° C. and the particulate PTFE having a molecular weight of 300,000 or less had a melting point of 330° C., as stated in the list of the materials for the composition before. The surfaces of the vulcanized rubber sheets were spray coated with the same material for a sliding-treated layer including a fluororubber as the matrix as that used in the examples described above. The coated rubber sheets were placed in a heating tank and the material for a sliding-treated layer was baked at a temperature of 300° C. for 10 minutes to form a sliding-treated layer having a thickness of 50 μm. Test pieces having a width of 5 mm and a length of 50 mm was punched from the baked rubber sheets and subjected to a peeling test conducted by a tensile testing machine at a pull rate of 50 mm per minute. In Comparative Examples, the surfaces of the same vulcanized rubber sheets were coated with a sliding treatment agent containing a urethane resin as the matrix as described in Examples in JP-A-2004-60819, it was baked to form a sliding-treated layer having a thickness of 50 μm and similar test pieces were punched therefrom for a peeling test. The test results are shown in Table 2. The sliding-treated layer containing a fluororubber as the matrix showed about three times as high a peeling strength as the layer containing a urethane resin as the matrix.

TABLE 2

| | Matrix of Sliding-treated layer (binder) | |
|---|---|---|
| | Urethane resin (Comparative Example) | Fluororubber (Example) |
| Peeling Strength (N/cm) | 1.04 | 3.00 |

(2) Sliding Property (Coefficient of Dynamic Friction):

The surfaces of the same vulcanized rubber sheets as those employed in the peeling tests above were spray coated with materials for a sliding-treated layer containing progressively varied amounts of particulate PTFE having a molecular weight of 300,000 or less, and otherwise repeating the examples described above, and they were baked in the same way. The particulate FEP used therein had a melting point of 270° C. and the particulate PTFE having a molecular weight of 300,000 or less had a melting point of 330° C., as stated in the list of the materials for the composition before. Test pieces having a width of 50 mm and a length of 150 mm were punched from the baked rubber sheets. A watch glass carrying a weight thereon (the weight and watch glass having a total weight of 220 g) was caused to slide on each test piece at a pull rate of 200 mm per minute in a tensile testing machine to measure its coefficient of dynamic friction. The test results are shown in Table 3. In Table 3, the amounts of particulate PTFE having a molecular weight of 300,000 or less are shown in parts by mass relative to 100 parts by mass of matrix. While even the sheet not containing any particulate PTFE having a molecular weight of 300,000 or less showed a satisfactorily low coefficient of dynamic friction owing to the sliding thin film formed from FEP, the sheets containing particulate PTFE having a molecular weight of 300,000 or less showed a still lower coefficient of dynamic friction with an increase in the amount of PTFE and thereby exhibited very high levels of sliding properties.

TABLE 3

| | Amounts of Particulate PTFE (by mass) | | | | |
|---|---|---|---|---|---|
| | 0 | 3 | 5 | 7 | 15 |
| Coefficient of Dynamic Friction | 0.55 | 0.42 | 0.30 | 0.28 | 0.27 |

(3) Elongation:

Spray coating was repeated a multiplicity of times to coat the surfaces of aluminum thin films with the same material for a sliding-treated layer containing a fluororubber as the matrix as that used in the examples described before and it was baked by employing progressively varied baking temperatures and otherwise repeating the examples described before to form a sliding-treated layer having a thickness of 50 μm. A JIS #6 dumbbell specimen was punched from the sliding-treated layer peeled off each aluminum thin film and was examined for elongation by a tensile testing machine at a pull rate of 50 mm per minute. The sliding-treated layer which had been formed by baking at a temperature of 300° C. showed an elongation as high as 96%, while the known sliding-treated layer containing a urethane resin as the matrix showed an elongation of only about 45%, as stated before.

It is to be understood that the present invention is not limited by its examples described above, but that variations or modifications may be made without departing from the scope and spirit of the present invention.

Figure 7:
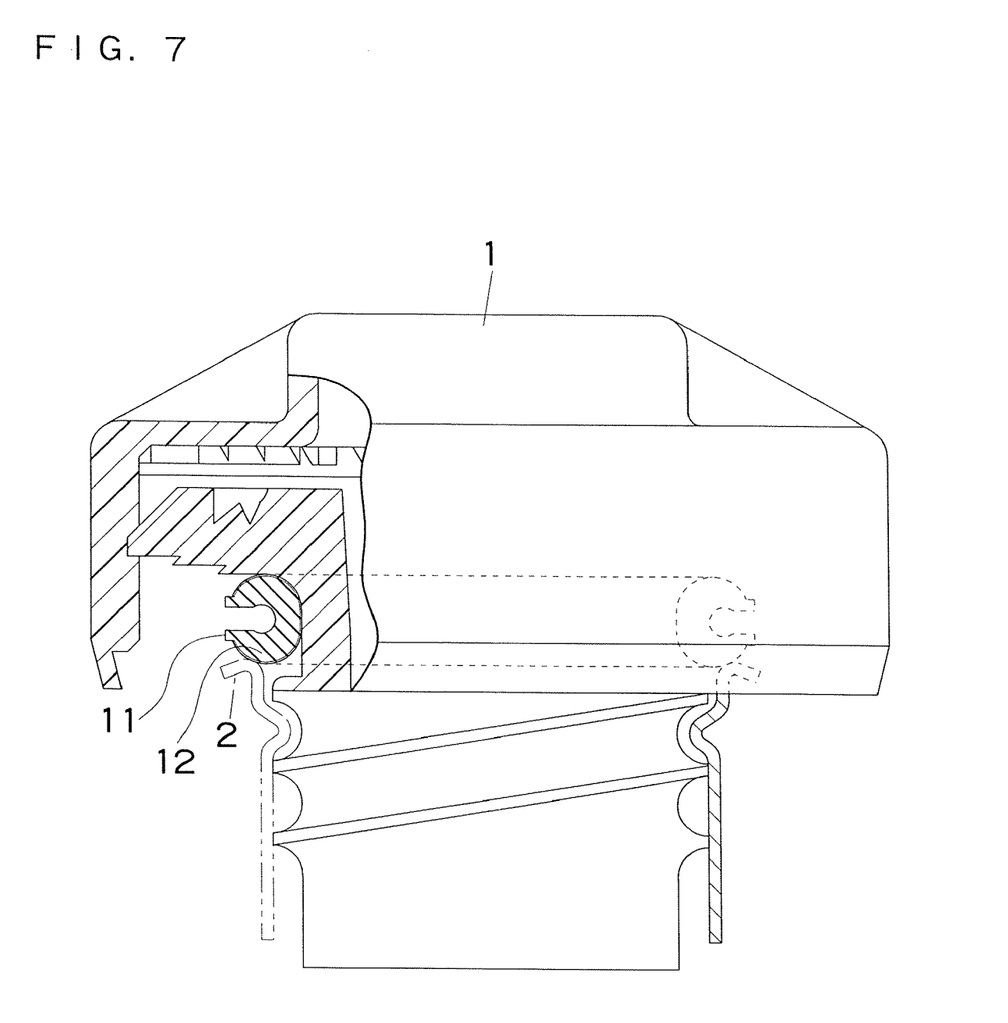
FIG. 7 is a cross-sectional view, partly in section, of a fuel cap including a gasket of another embodiment of the invention.

(1) The present invention can be embodied in various other forms of gaskets including a ring having a substantially C-shaped cross section and deformable only to a small extent, as shown in FIG. 7.

Figure 11A:
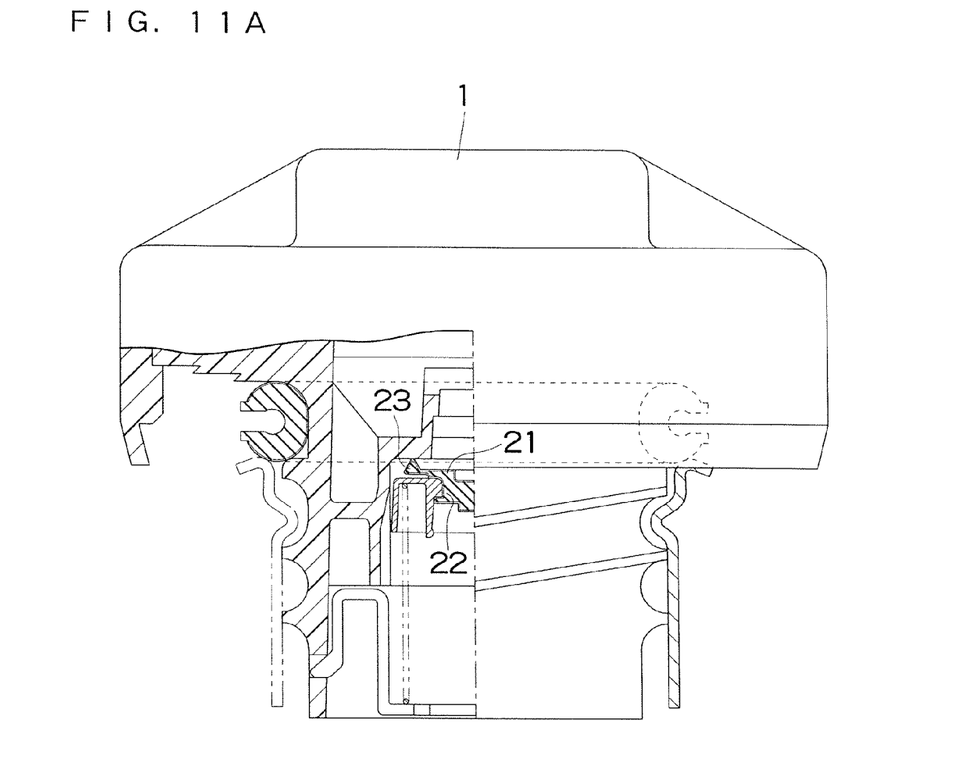
FIG. 11A is a cross-sectional view, partly in section, of a valve member in a pressure control valve for a fuel cap embodying the present invention.
Figure 11B:
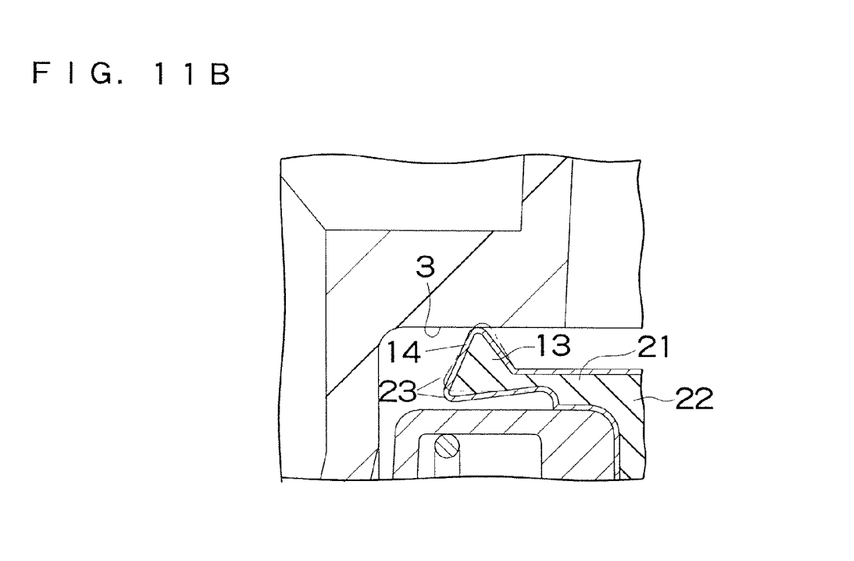
FIG. 11B is a fragmentary enlarged view of FIG. 11A.

(2) The present invention is not only applicable to a gasket, but is also applicable to a valve member 21 in a pressure control valve device situated inwardly of the gasket of a fuel cap 1, as shown in FIGS. 11A and 11B. The valve member 21 may be composed of a fluororubber base 13 and a sliding-treated layer 14 covering the surface of the base 13 described before as the examples. The valve member 21 has a fitting portion 22 by which it is fitted to the fuel cap 1, and a sealing portion adapted to contact a valve seat 3 to form a seal therebetween. The sealing portion 23 or the boundary between the sealing portion 23 and the fitting portion 22 is bent repeatedly and the smoothness of sliding between the sealing portion 23 and the valve seat 3 mitigates the stress produced in any such repeatedly bent portion. Thus, the application of the present invention is useful because of its advantages stated before, i.e. the sliding property of the sliding-treated layer and its resistance to separation and cracking.

What is claimed is:

1. A manufacturing method for a sealing member for fuel, comprising the steps of:

coating a fluororubber base surface of the sealing member for fuel with a paint composition which comprises a matrix comprising a fluororubber, a first particulate solid lubricant comprising a tetrafluoroethylene-hexafluoropropylene copolymer that can be melted, and a second particulate solid lubricant comprising a polytetrafluoroethylene having a molecular weight of 300,000 or less, and baking the paint composition after coated at a temperature which is higher than a melting point of the first particulate solid lubricant and lower than a melting point of the second particulate solid lubricant, whereby forming a sliding-treated layer coated on the base surface, wherein an amount of the first particulate solid lubricant is from 50 to 200 parts by mass for 100 parts by mass of the matrix, and an amount of the second particulate solid lubricant is from 5 to 30 parts by mass for 100 parts by mass of the matrix, based on dry mass.

2. The manufacturing method according to claim 1, wherein the first particulate solid lubricant has a particle diameter of from 0.1 to 1 μm.

3. The manufacturing method according to claim 1, wherein the second particulate solid lubricant has a particle diameter of from 0.1 to 1 μm.

* * * * *